United States Patent
Hendrick et al.

(10) Patent No.: US 12,130,480 B2
(45) Date of Patent: Oct. 29, 2024

(54) POLARITY SCHEME FOR MULTI-FIBER CONNECTORS WITH A CONNECTOR KEY

(71) Applicant: US Conec, Ltd., Hickory, NC (US)

(72) Inventors: Jeff Hendrick, Hickory, NC (US); Michael E. Hughes, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/746,195

(22) Filed: May 17, 2022

(65) Prior Publication Data

US 2022/0365292 A1 Nov. 17, 2022

Related U.S. Application Data (60) Provisional application No. 63/189,406, filed on May 17, 2021.

(51) Int. Cl.
*G02B 6/38* (2006.01)
*G02B 6/40* (2006.01)

(52) U.S. Cl.
CPC ........... *G02B 6/406* (2013.01); *G02B 6/3825* (2013.01); *G02B 6/3831* (2013.01)

(58) Field of Classification Search
CPC .. G02B 6/3825; G02B 6/3831; G02B 6/3885; G02B 6/406
See application file for complete search history.

(56) References Cited

U.S. PATENT DOCUMENTS 10,191,227 B2 * 1/2019 Lee ....................... G02B 6/4453
10,495,817 B2 12/2019 Gurreri 2019/0339458 A1 * 11/2019 Pimpinella ........... G02B 6/3863
2019/0346633 A1 11/2019 Cloud et al.
2021/0080663 A1 * 3/2021 Takano ................ G02B 6/3825
2022/0107467 A1 4/2022 Higley et al.

FOREIGN PATENT DOCUMENTS

WO 2021217054 A1 10/2021

OTHER PUBLICATIONS

TIA-568.3-D standard pp. 10-12, Sections reproduced under written permission from Telecommunications Industry Association, Oct. 25, 2016.

* cited by examiner

*Primary Examiner* — Omar R Rojas
(74) *Attorney, Agent, or Firm* — Michael L Leetzow PLLC; Shubhrangshu Sengupta (57) ABSTRACT

Optically connecting two transceivers requires the transmitting portion of one transceiver matches with the receiving portion of the other transceivers. This requires that the polarity of the fiber optic connectors (attached to one another in a jumper) that connect the two transceivers is correct. Maintaining the correct polarity in the field can be confusing, time-consuming, and difficult to achieve. Not to mention that the installers need to make sure they have the correct number and polarity of the jumpers. This is further complicated when the fiber optic connectors are VSFF and have a key on a short side of the fiber optic connector. A system that involves an A-to-B patch cord and an opposed key adapter solves each of these issues. Only one type of patch cord (A-to-B) and one type of adapter is needed. With these components, an installer can connect the two transceivers without any mistakes.

17 Claims, 10 Drawing Sheets

POLARITY SCHEME FOR MULTI-FIBER CONNECTORS WITH A CONNECTOR KEY

REFERENCE TO RELATED CASE

This application claims priority under 35 U.S.C. § 119 (e) to U.S. provisional application No. 63/189,406 filed on May 17, 2021, the contents of which are hereby incorporated by reference in their entirety.

BACKGROUND OF THE INVENTION

Maintaining polarity is a critical aspect of optical communication links. Improper polarity causes communications to cease because a transmitter that should be communicating with a receiver is now trying to communicate with another transmitter. When the first transmitter is not communicating with the correct allocated receiver, the optical communication link has failed due to an incorrect polarity.

Most optical fiber connectors have a connector key or an identifier that is used to indicate the polarity of the fiber-optic connector. In some cases, the connector key may also be used for insertion loss tuning purposes in some connectors. Current multifiber connectors have a connector key on a long side of the multifiber connector to identify the polarity of the multifiber connector. The adapters or receptacles that are used to mate two multifiber connectors also have a key or a key groove/receptacle also on a long side. Some single fiber connectors, such as the LC and SC connectors will use a clipping mechanism to create a multifiber (duplex) connector from two single connectors. These duplex connectors also have the keys located on the long side of the duplex connector thus created. A polarity scheme for these types of connectors has been created and is listed in several standards, including TIA-568.3, the contents of which are incorporated by reference herein.

For duplex connectors, polarity is often defined by the TIA-568-3 586 SC connector. This polarity method allows creating a duplex optical link from one transceiver to another transceiver by simply using an A-B jumper/patch cord and aligned key adapters. That is, the keys are on the same sides of the aligned key adapter. This is very important to systems installers and end users alike because only one type of adapter is needed and one type of cable assembly is needed for such standard SC adapters. Up until recently, this polarity method could be used with typical duplex connectors because of the connector key location being on the long side and adapter keying orientation.

The ferrules of the duplex SC connector pair are labeled "A" and "B." The "A" ferrules are always located on the right side of the duplex connector pair (with the connector key in the upward facing position) and the "B" ferrules are always located on the left side of the connector pair (with the connector key in the upward facing position). The "A" ferrules always connect to a "B" ferrule on the other side of the adapter. Likewise, the "B" ferrules always connect to an "A" ferrule due to the positioning of the ferrules in the connector pair, the key being on the long side of the connector pair (the key is also perpendicular to the plane of the ferrules), and the adapter keys being aligned with one another. The adapter keys are also on the long sides of the adapter.

The relative positioning of the keys for the arrayed fiber MPO connectors is the same as for the duplex connectors. The adapter keys are on the long side of the adapter and match up with the keys on the MPO connectors mating from opposite openings of the adapter. Such a long-side key arrangement is true for both Type "A" adapter configuration ("key-up to key-down") and the Type "B" adapter configuration ("key-up to key-up").

However, a new style of duplex connector has recently emerged in the optical fiber industry due to an ever increasing need for a higher connector density at an optical interconnect or optical cross-connect. These Very Small Form Factor (VSFF) connectors are almost one third the footprint of standard duplex connectors, and thus provide three times the density at an adapter or an adapter panel (with the standard footprint). One such fiber-optic connector is the MDC connector provided by the Applicant and increasingly in use across the industry. To further maximize connector density, the VSFF connectors have a connector key placed on the short side of the connector (the key is parallel to a plane that passes through the ferrules), as opposed to the long-side in conventional duplex/MPO connectors. See FIG. 2 showing a side (elevation) view of an example MDC style duplex connector, with a corresponding transceiver arrangement. This connector is described in more detail in Applicant's pending U.S. patent applicant Ser. No. 17/426,051 and published as U.S. Patent Pub. No. 2022/0107467, the contents of which are incorporated by reference in their entirety. See also in FIG. 1, a layout of a conventional duplex LC uniboot connector (viewed from top) with a corresponding LC transceiver layout. This connector is also the subject of Applicant's patent application Ser. No. 16/410,935 (published as US Patent Pub. No. 2019/0346633), the contents of which are incorporated by reference herein. In the figures "Tx" stands for a transmitter (e.g., a laser source) as is conventional notation, and "Rx" stands for a receiver (e.g., a photodiode array). The notation of the "A" ferrule (or optical fiber) and the "B" ferrule (or optical fiber) is based on which ferrule faces the transmitter and which faces the receiver. The B ferrule is attached to the transmitter and the A ferrule is attached to the receiver.

When attempting to use the TIA-568.3 568SC polarity scheme with VSFF connectors, or any connector with the key on the shorter side of the connector, proper polarity cannot be maintained in all situations to ensure the transmitter will communicate with the opposing receiver. For example, when systems contain an odd number of patch panels (or adapters), an "A-to-A" patch cord or cable assembly must be used at some point in the network to maintain the proper polarity. At other times, an "A-to-B" patch cord may be needed. The terminology with respect to "A-to-A" and "A-to-B" patch cord is understood in the industry by one of ordinary skill in the art. When in a patch cord, the ferrule connections are crossed between two connectors of the same patch cord, the patch cord is an "A-to-B" patch cord—the A fiber in one fiber optic connector matches to the B fiber in the other fiber optic connector. The terminology is also clear from the drawings accompanying this disclosure. This means installers and end users must order, inventory, and use multiple types of cable assemblies ("A-to-A" and "A-to-B" patch cords) to ensure proper communication in their communication networks. They must also track the types of cable assemblies already used and the resulting polarity.

Figure 3:
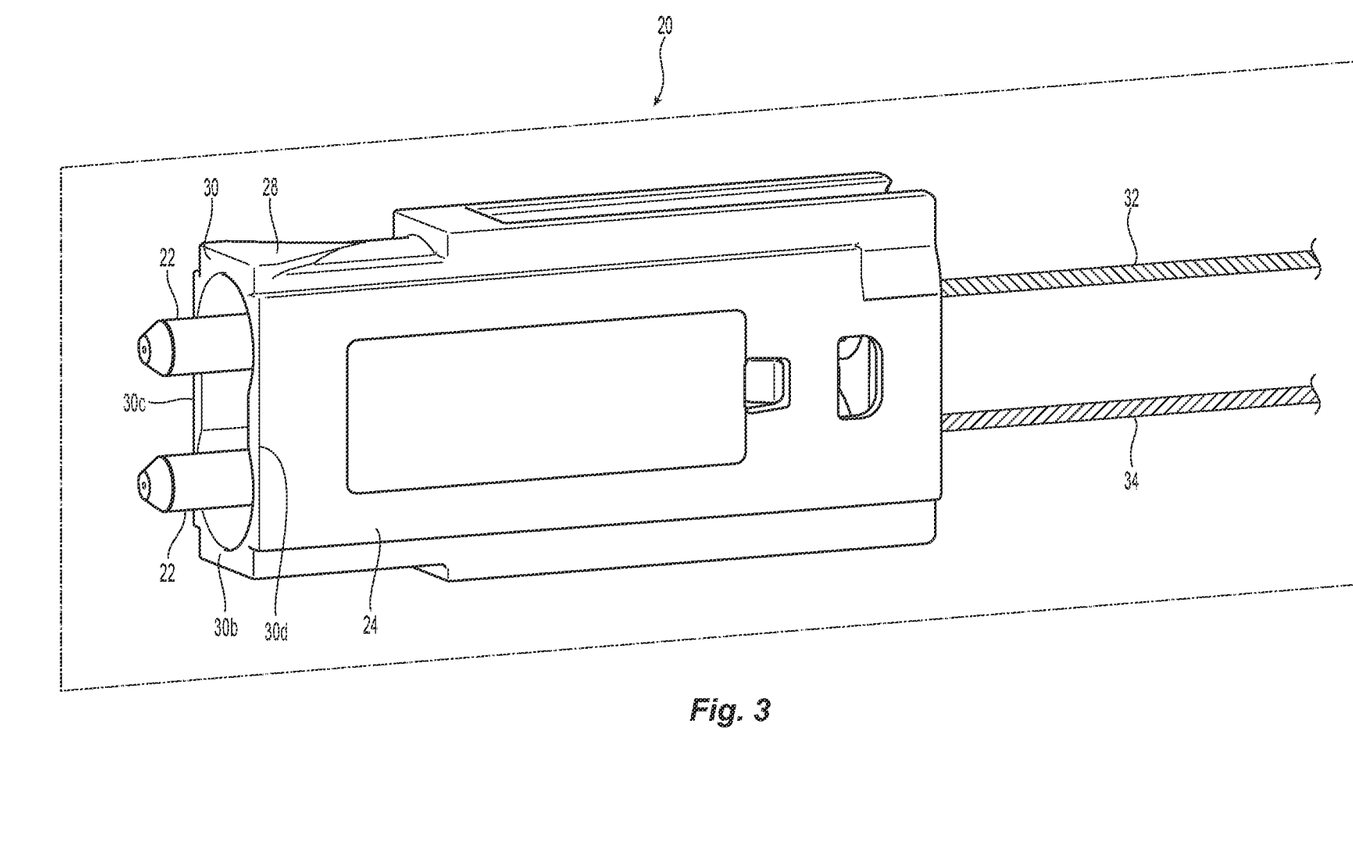
FIG. 3 is a perspective view of the housing, fiber optic ferrules, and optical fibers used with the MDC style duplex connector in FIG. 2

Accordingly, to avoid the above-noted complexity in different patch cord types and flips, a new polarity method for these new connectors will provide for a much simpler installation involving a minimal amount of components and cable assemblies. When using VSFF connectors or any connector in which the connector key is on the short side of the connector (or the connector key is in the plane of the ferrules, or the connector key is parallel to the ferrules, see FIG. 3), the use of an opposing key adapter will create a much simpler installation. The polarity of any duplex optical link, independent of the number of patch panels (or adapters), can be maintained from transceiver to transceiver by only using opposing key adapters and only one type of a patch cord—an A-to-B patch cord having the two VSFF connectors on opposite ends thereof.

SUMMARY OF THE INVENTION

According to one aspect, the present invention is directed to an optical patch panel connection that includes a first multi-fiber connector having a connector key on a first short side thereof and a second multi-fiber connector having a connector key on a second short side thereof, the first and the second multi-fiber connectors being connected together by optical fibers to form a first A-to-B patch cord, and at least one adapter having an opening extending between a first side and a second side to receive one of the first and the second multi-fiber connectors, the opening bound by a pair of long sided walls and a pair of short sided walls and extending between the first and second sides, the adapter including a first keyway at the first side and a second keyway at the second side and the first keyway on an opposite side of the opening from the second keyway, the first and the second keyways being in communication with the opening, wherein the first A-to-B patch cord is connected to the adapter on the first side with the connector key of the first or the second multi-fiber connector mated to the first keyway and to a second A-to-B patch cord identical to the first A-to-B patch cord, the second A-to-B patch cord having a third multi-connector and a fourth multi-fiber connector connected together in a configuration identical to the first multi-fiber connector and the second multi-fiber connector, and wherein the second A-to-B patch cord is connected to the adapter on the second side with the connector key of the third or the fourth multi-fiber connector mated to the second keyway.

In some embodiments, each of the multi-fiber connectors is a duplex connector.

In some embodiments, the first multi-fiber connector and the second multi-fiber connector each support at least three optical fibers.

In some embodiments, the first keyway at the first side is on one of the pair of short sides and the second keyway at the second side is on another of the pair of short sides.

In some embodiments, the optical patch panel connection has a plurality of adapters that are identical to the at least one adapter and a plurality of A-to-B patch cords that are identical to the first A-to-B patch cord.

In some embodiments, at least one of the A-to-B patch cords is connected to a transceiver.

In other embodiments, the adapter has a plurality of openings.

In yet another aspect, there is an optical patch panel connection that includes a first multi-fiber connector having a connector key and a second multi-fiber connector having a connector key opposite to the connector key of the first multi-fiber connector, the first and the second multi-fiber connectors being connected together by optical fibers to form a first A-to-B patch cord, and at least one adapter attachable to an optical patch panel, the at least one adapter having an opening extending between a first side and a second side to receive one of the multi-fiber connectors, the opening bound by a pair of long sided walls and a pair of short sided walls and extending between the first and second sides, the adapter including a first keyway on the first side and a second keyway on the second side, the first and the second keyways being in communication with the opening, wherein the first A-to-B patch cord is connected to the adapter on the first side with the connector key of the first or the second multi-fiber connector mated to the first keyway and to a second A-to-B patch cord identical to the first A-to-B patch cord, the second A-to-B patch cord connected to the adapter on the second side with a connector key of a corresponding multi-fiber connector mated to the second keyway.

In some embodiments, each of the multi-fiber connectors is a duplex connector.

In some embodiments, the first multi-fiber connector and the second multi-fiber connector each support at least three optical fibers.

In some embodiments, the first keyway at the first side is on one of the pair of short sides and the second keyway at the second side is on another of the pair of short sides.

In some embodiments, the optical patch panel connection has a plurality of adapters that are identical to the at least one adapter and a plurality of A-to-B patch cords that are identical to the first A-to-B patch cord.

In some embodiments, at least one of the A-to-B patch cords is connected to a transceiver.

In other embodiments, the adapter has a plurality of openings.

In other embodiments, the first and second keyways are on opposite sides of the opening.

In yet another aspect, there is an optical patch panel connection to connect two transceivers to one another that includes a plurality of A-to-B patch cords, each of the plurality of A-to-B patch cords being identical and consisting of a first multi-fiber connector having a connector key and a second multi-fiber connector having a connector key in a flipped orientation relative to the connector key of the first multi-fiber connector, the first and the second multi-fiber connectors being connected together by optical fibers, and a plurality of adapters, each of the plurality of adapters being identical and having an opening extending between a first side and a second side, the opening to receive the first multi-fiber connector from a first of the plurality of A-to-B patch cords on the first side and to receive the first multi-fiber connector from a second of the plurality of A-to-B patch cords on the second side, the adapter including a first keyway on the first side to receive the connector key from the first fiber optic connector from the first of the plurality of A-to-B patch cords and a second keyway on the second side to receive a connector key from the second fiber optic connector from the second of the plurality of A-to-B patch cords, the first and second keyways being on opposite sides of the opening.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
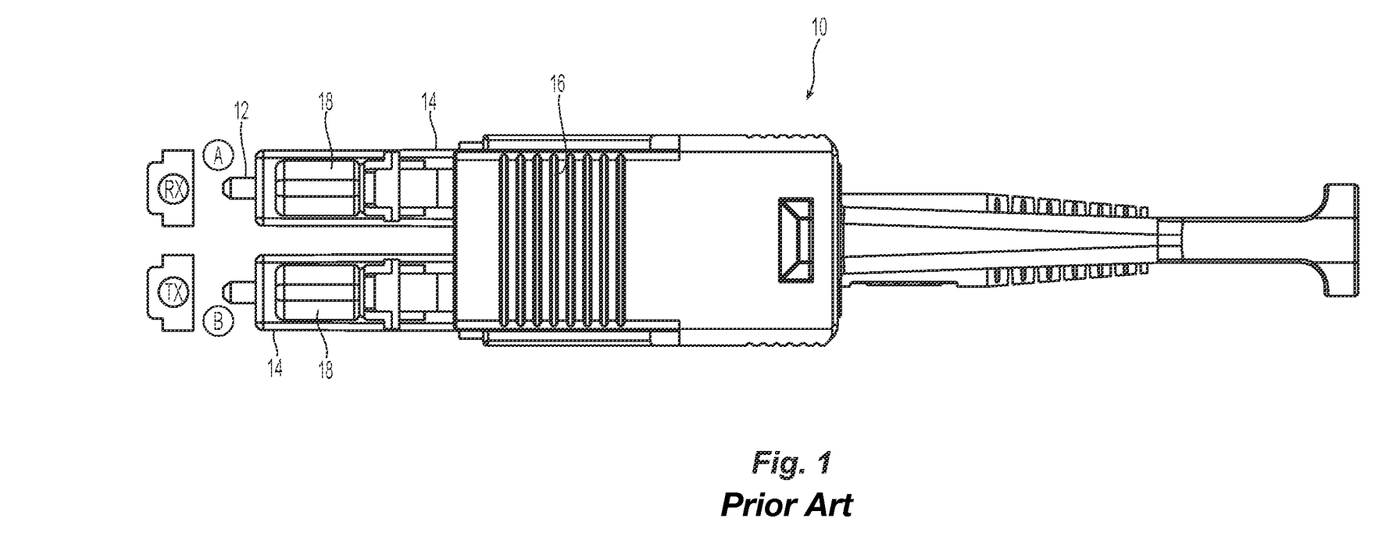
FIG. 1 is a top view of a conventional duplex LC uniboot connector.
Figure 2:
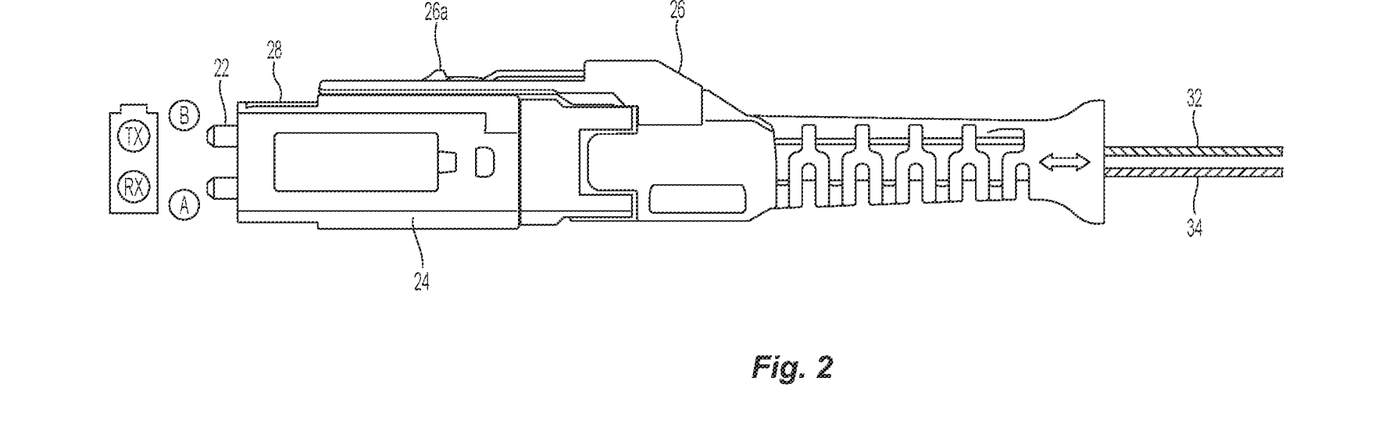
FIG. 2 is a side elevational view of an MDC style duplex connector that is one embodiment of a multi-fiber connector that can be used with the present invention.

Illustrated in FIG. 1 is, as noted above, a conventional duplex LC uniboot connector 10. There are two fiber optic ferrules 12 within housings 14 and the housings 14 retain the optical fibers (not shown). There is also an assembly 16 that holds the two housings 14 relative to one another. The "A" ferrules are always located on the right side of the duplex connector pair (with the connector key 18 in the upward facing position) and connect to the receiver (RX), while the "B" ferrules are always located on the left side of the connector pair (with the connector key in the upward facing position) and connect with the transceivers (TX). The "A" ferrules always connect to a "B" ferrule on the other side of the adapter. Likewise, the "B" ferrules always connect to an "A" ferrule due to the positioning of the ferrules in the connector pair, the key being on the long side of the connector pair (the key is also perpendicular to a plane containing both the ferrules), and the adapter keys being aligned with one another.

Illustrated in FIG. 2 is the duplex MDC connector 20, which also has two fiber optic ferrules 22 within the housing 24. The duplex MDC connector 20 also has a push-pull boot 26 that, among other features, acts as a connector key 26a for the connector 20. The housing 24 has a polarity indicia 28 on one of the short sides 30a (with an opposing short side 30b and two long sides 30c,30d). The housing 24, the polarity indicia 28, the fiber optic ferrules 22, and the optical fibers 32,34 are shown in more detail in FIG. 3. It should also be noted that the fiber optic ferrules 22, the optical fibers 32,34 and the key 26a all lie in a single vertical plane. See FIGS. 2 & 3. The connector key 26a is also disposed on one of the short sides, which is short side 30a in this figure. The polarity indicia 28 is a raised area of the housing 24 having a generally triangular shape. However, the polarity indicia 28 could take on configurations other than triangular (a line, a square, inverted triangle, circle, etc.) and it need not be a part of the housing 24, but could be a coloration, dot, etc. The polarity indicia 28 is important in the duplex MDC connector 20 because once the optical fibers 32,34, are terminated and the connector is assembled, it is impossible to see the optical fibers. Thus, if there is no polarity indicia, it is not possible to identify the locations of the optical fibers 32,24 within the duplex MDC connector 20. Without knowing the configuration of the optical fibers 32,34 within the duplex MDC connector 20, it would not be possible to know if you have an A-to-A patch cord or an A-to-B patch cord. Thus, applicant has included the polarity indicia 28 on the duplex MDC connector 20 and the first fiber (the blue) fiber is always secured within the fiber optic ferrule 22 closest to the polarity indicia 28. It should be noted that the push-pull boot 26 can be rotated around the optical fibers 32,24 relative to the housing 24. This makes the identification of the position of the optical fibers 32,34 relative to the housing 24 even more significant because without the polarity indicia 28 on the housing of the MDC connector 20, a user holding the assembled MDC connector 20 will not be able to infer the order of the optical fibers inside between the first position of the push-pull boot 26 and a rotated position of the push-pull boot 26.

Figure 4:
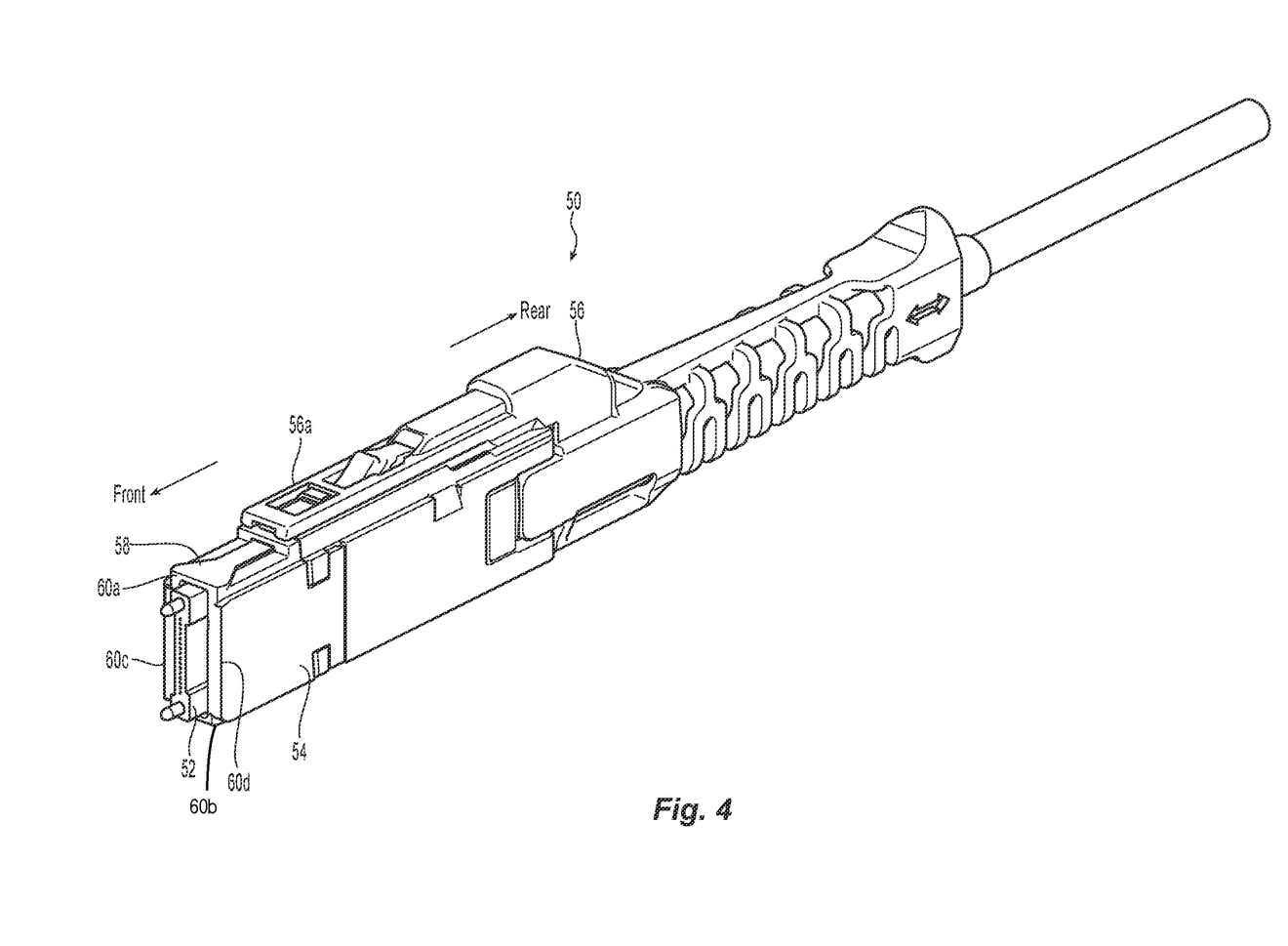
FIG. 4 is a perspective view of another embodiment of a multi-fiber fiber optic connector that can be used with the present invention.

In FIG. 4 is another fiber optic connector 50 that can be used in the present invention. The fiber optic connector 50 has a multi-fiber fiber optic ferrule 52, a housing 54, a push-pull boot 56 with a key 56a. The housing 54 has two short sides 60a,60b and two long sides 60c,60d, with a polarity indicia 58 on one of the short sides 60a. The multi-fiber fiber optic ferrule 50 is described in more detail in Applicant's published Patent Application WO2021/217054 published on Oct. 18, 2021. The multi-fiber fiber optic ferrule 52 can receive at least three optical fibers, and more appropriately, 16 or 32, however there may be more or fewer optical fibers. As with the prior embodiment, the optical fibers are secured within the multi-fiber fiber optic ferrule 52 with the first or blue fiber adjacent the polarity indicia 58. Once the multi-fiber fiber optic connector 50 is fully assembled, again it is impossible to identify the order of the optical fibers within the multi-fiber fiber optic connector 50 without the polarity indicia.

In the following discussion, the following conventions are followed. The notation of the "A" ferrule (or optical fiber) and the "B" ferrule (or optical fiber) is based on which ferrule faces the transmitter and which faces the receiver. The "B" ferrule (or optical fiber) is attached to the transmitter and the "A" ferrule (or optical fiber) is attached to the receiver. Also, the optical fibers are visible in the figures only to show the relationships of the components. When the patch cords are fully assembled, the optical fibers are not visible. Some of the representations of the transceiver are illustrated to be upside down, i.e., the keyways are on the bottom and the TX and RX indicia are also upside down. Again, this is only done for the convenience of the explanations provided herein. The transceivers are not, in practice, inverted as illustrated.

Figure 5:
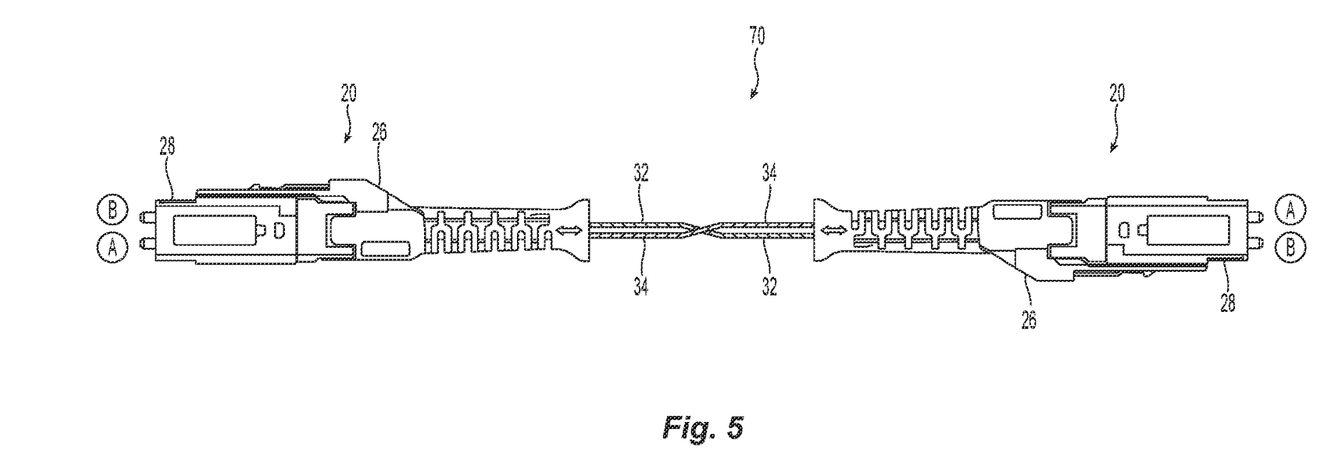
FIG. 5 is a side elevation view of one example of an "A-to-A" patch cord.
Figure 6:
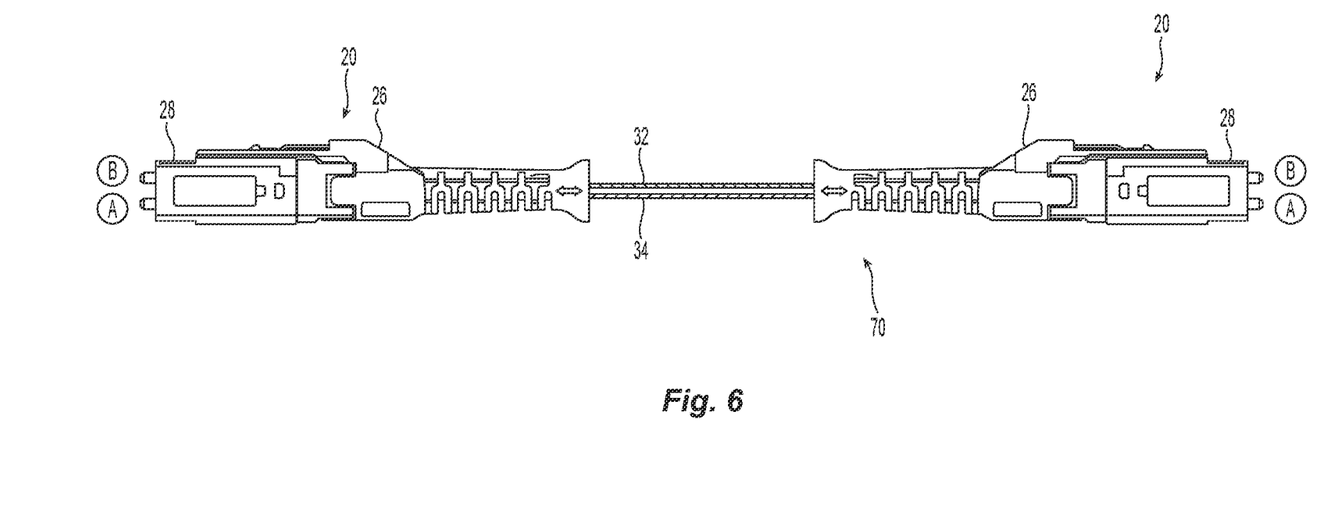
FIG. 6 is a side elevation view of the "A-to-A" patch cord in FIG. 5 with one of the multi-fiber fiber optic connectors rotated.

Turning now to FIGS. 5 and 6, there is an A-to-A patch cord 70. The difference between FIG. 5 and FIG. 6 is that in FIG. 5, the right side duplex MDC connector 20 has been rotated 180 degrees about an axis through the two duplex MDC connectors 20. Thus, the optical fibers 32,34 are illustrated to be crossed over each other. In each of these patch cords 70, the "A" ferrule (or optical fiber) on the right side is connected to the "A" ferrule (or optical fiber) on the left side. The polarity indicia 28 on the right patch cord 70 is on the bottom in the figure while the polarity indicia 28 on the left patch cord 70 is on the top. The patch cord 70 in FIG. 6 is ready to be plugged into a transceiver since the push-pull boot 26 is oriented on the top. As one of skill in the art would recognize, there has to a flip in the optical fibers or connectors in order for the patch cords 70 to connect two transceivers or the transmit will be connected to the transmit and the receive to the receive optical fibers, which would render the communication link inoperable.

Figure 7:
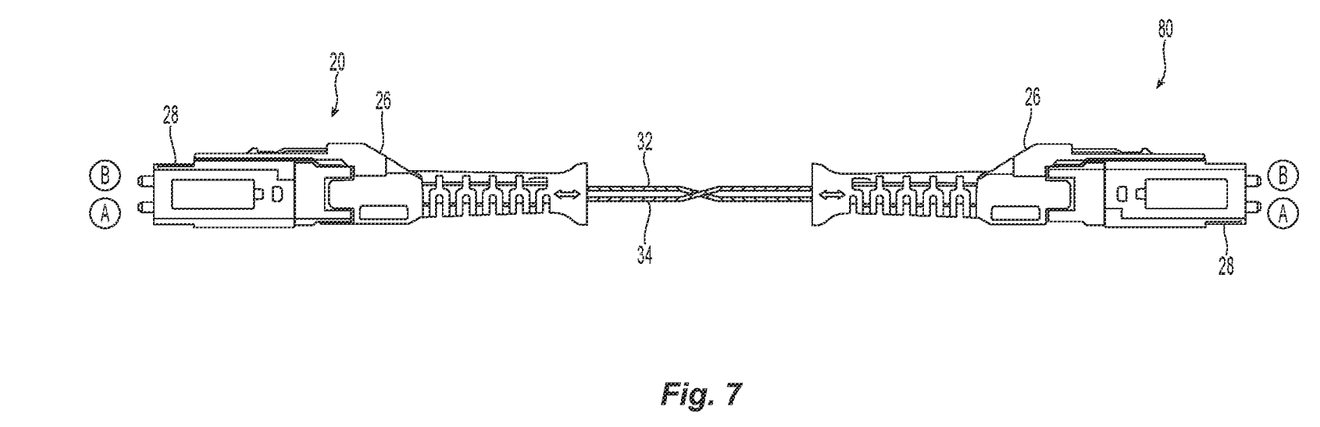
FIG. 7 is side elevation view of one example of an "A-to-B" patch cord.
Figure 8:
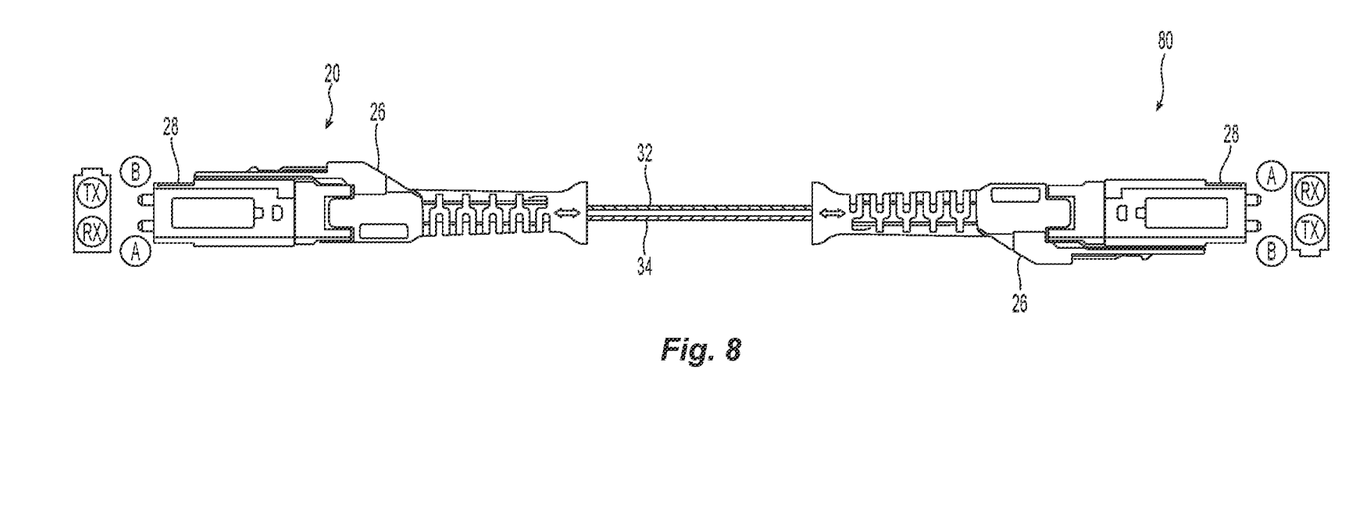
FIG. 8 is a side elevation view of the "A-to-B" patch cord in FIG. 7 with one of the multi-fiber fiber optic connectors rotated.

Turning now to the patch cords in FIGS. 7 and 8, where an A-to-B patch cord 80 is illustrated. The patch cords 80 are the same as the other patch cords (with relation to construction of the connectors and the presence and number of optical fibers). However, in patch cord 80, the "A" ferrule (or optical fiber 34) in the duplex MDC connector 20 on the left side is connected to the "B" ferrule in the duplex MDC connector 20 on the right side (or vice versa). See FIG. 7. The flip (A joined with B, rather than the situation where A is joined to A) is illustrated with the cross-over of the optical fibers 32,34. In this arrangement, the transmitters would be connected to the receivers. FIG. 8 merely shows that if the patch cord 80 in FIG. 7 is rotated 180 degrees, the optical fibers are not crossed over, but the duplex MDC connector 20 is connected to the optical fibers upside down. Thus, the A to B connection is more clearly visible in FIG. 8.

Figure 9:
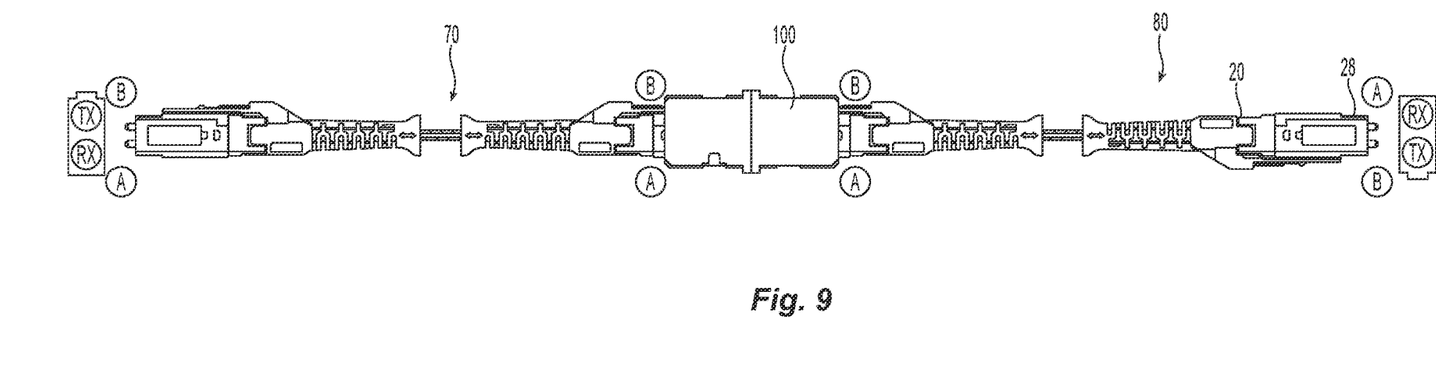
FIG. 9 is a side elevation view of an "A-to-B" patch cord, an "A-to-A" patch cord, and an aligned key adapter used to connect two transceivers.

FIG. 9 shows the connection of two transceivers when there is a patch panel or an adapter 100 that needs to be used in the connection of the two transceivers. Again, it is noted that the convention of the right transmitter is upside down, reflecting the need for at least one flip of the optical fibers 32,34 to achieve the transmitter/receiver connection.

In FIG. 9, there is a patch cord 80 on the right side (cf. FIG. 8) and a patch cord 70 on the left. These two patch cords 70,80 are joined by the adapter 100. The adapter 100 is an aligned key adapter, meaning that it is a "key-up to key-up" or a "key-down to key-down" (pass-through) adapter. Thus, in the adapter 100, the A ferrule in patch cord 70 is aligned to the A ferrule in patch cord 80. This arrangement provides the flip to allow the transmitters to be connected to the receivers in the transceivers. However, as noted, this arrangement requires that the technician carry both the A-to-A patch cord 70 and the A-to-B patch cord 80.

In order to reduce the different configurations, the present invention of an optical patch panel connection recognizes that if there are only A-to-B patch cords and an opposed key adapter, the correct connections can be made while requiring fewer configurations of patch cords. Indeed, only the A-to-B patch cord would be necessary.

Figure 10:
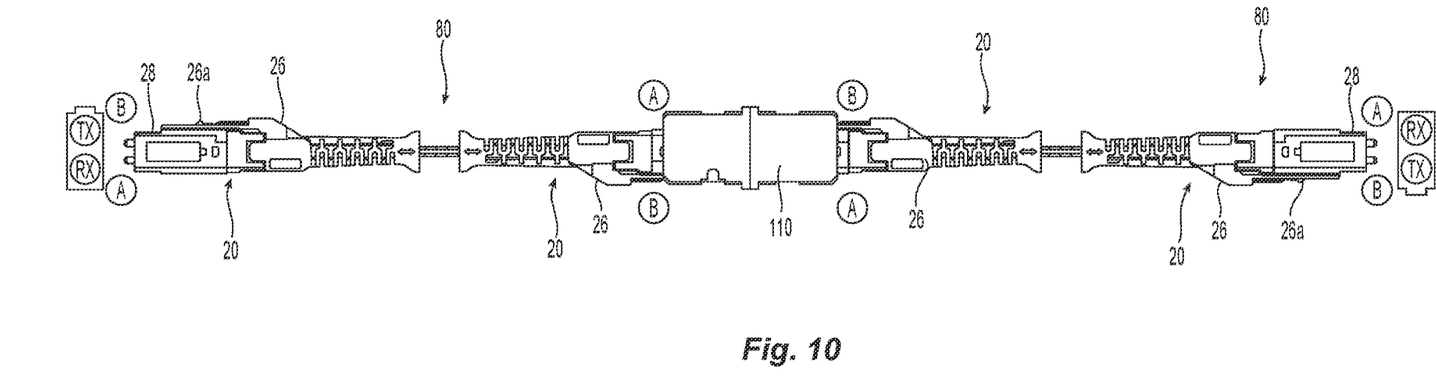
FIG. 10 is a side elevation view of two identical "A-to-B" patch cords and an opposed key adapter used to connect two transceivers.

Turning to FIG. 10, the optical patch panel connection in one embodiment includes two A-to-B patch cords 80 that are connected to one another by an opposed key adapter 110. See also FIG. 11. In effect, the opposed key adapter 110 acts as another A-to-B patch cord, providing the required odd number of flips in this optical patch panel connection.

As noted above, each of the A-to-B patch cords have a first multi-fiber connector 20 having a connector key 26a on a first short side thereof 30a and a second multi-fiber connector 20 having a connector key 26a on a second short side 30b thereof, the first and the second multi-fiber connectors being connected together by the optical fibers 32,34.

Figure 11:
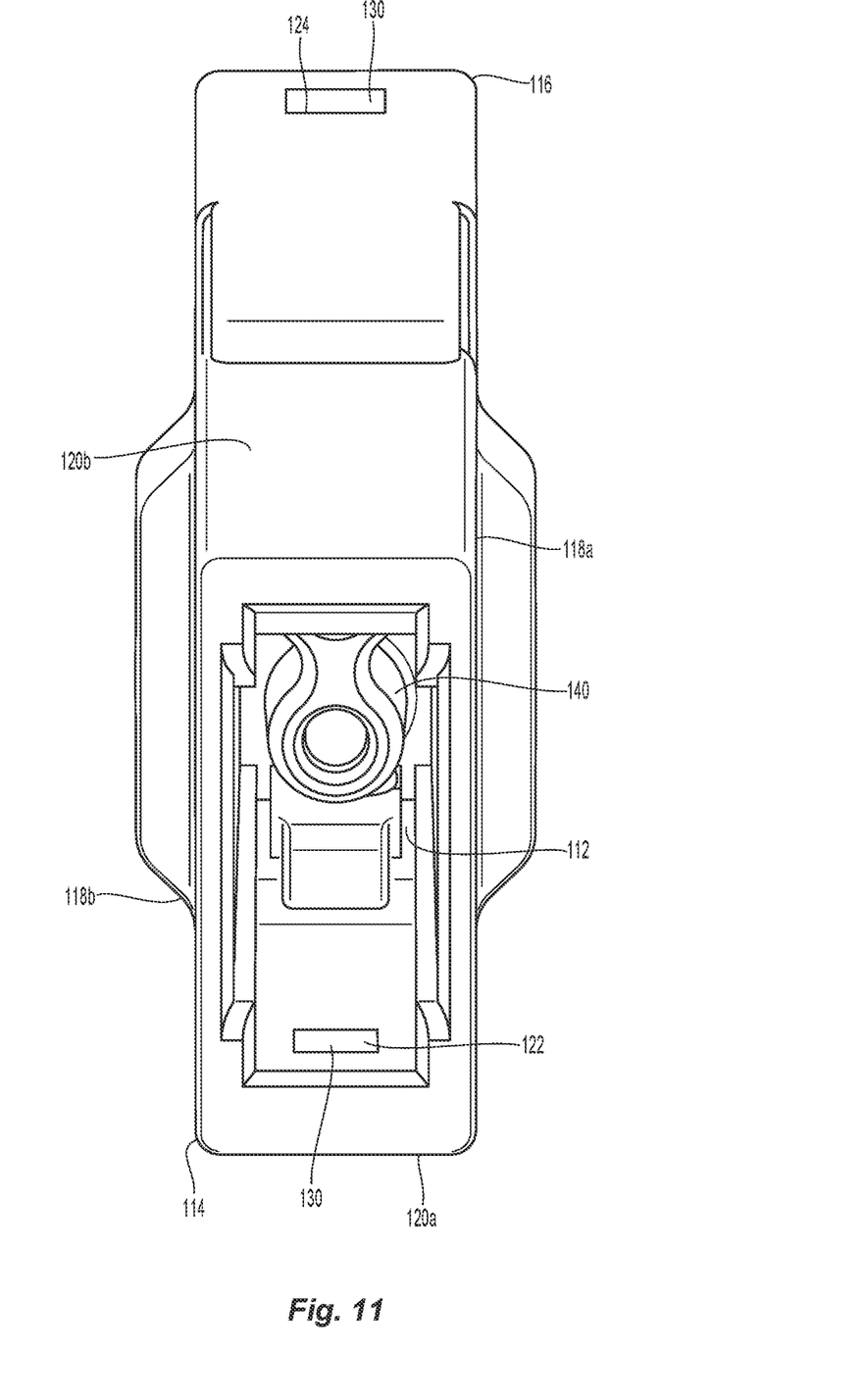
FIG. 11 is a perspective of one embodiment of an adapter to be used with the present invention.
Figure 12:
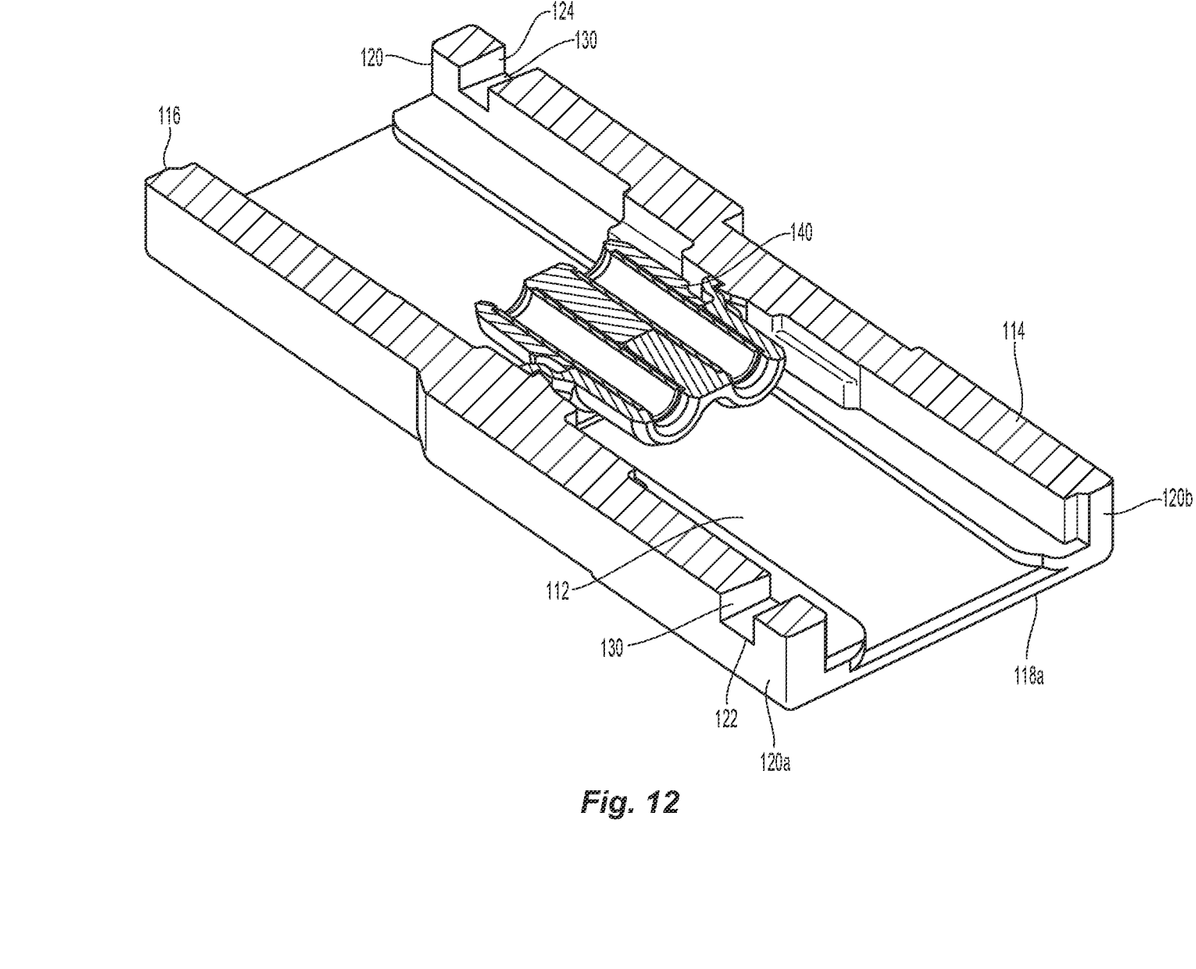
FIG. 12 is a cross section view of the adapter in FIG. 11.

One embodiment of an adapter 110 to be used with the invention is illustrated in FIGS. 11 and 12. The adapter 110 has an opening 112 extending between a first side 114 and a second side 116 to receive one of the first and the second multi-fiber connectors 20. The opening 112 is bounded by a pair of long sided walls 118a,118b and a pair of short sided walls 120a,120b. The opening 112 extends between the first and second sides 114,116. The adapter 110 has a first keyway 122 at the first side 114 and a second keyway 124 at the second side 116. The keyways 122,124 in this adapter include an opening 130 in one of the short sided walls 120a,120b. The keyways 122,124 being on opposite short sided walls 120a,120b and across the opening 112 from each other, but both are in communication with the opening 112. That is, the opening 112 is formed by the pair of long sided walls 118a,118b that are opposite each other and a pair of short sided walls 120a,120b that are opposite each other. Thus, when one keyway 122 is on one short sided wall 120a and the other keyway 124 is on the other short sided wall 120b, they are across the opening 112, and thus opposite to each other in terms of their location on the adapter 110. Hence the term "opposed key" adapter 110. The adapter 110 may also have other support structures 140 that support and assist in mating the duplex MDC connector 20 from each side.

It should be noted that there may also be an elongated groove or other structure that allows for the connector keys 26a to only be inserted in one orientation in each of the first and second sides 114,116 of the opening 112.

While the duplex MDC connector 20 has been discussed in conjunction with the optical patch panel connection, it is also possible for other multi-fiber connectors to be used. For example, the fiber optic connector 50 with the multi-fiber fiber optic ferrule 52 can also be used in an A-to-B patch cord in the same manner as an A-to-B patch cord using two MDC connectors 20.

Figure 13:
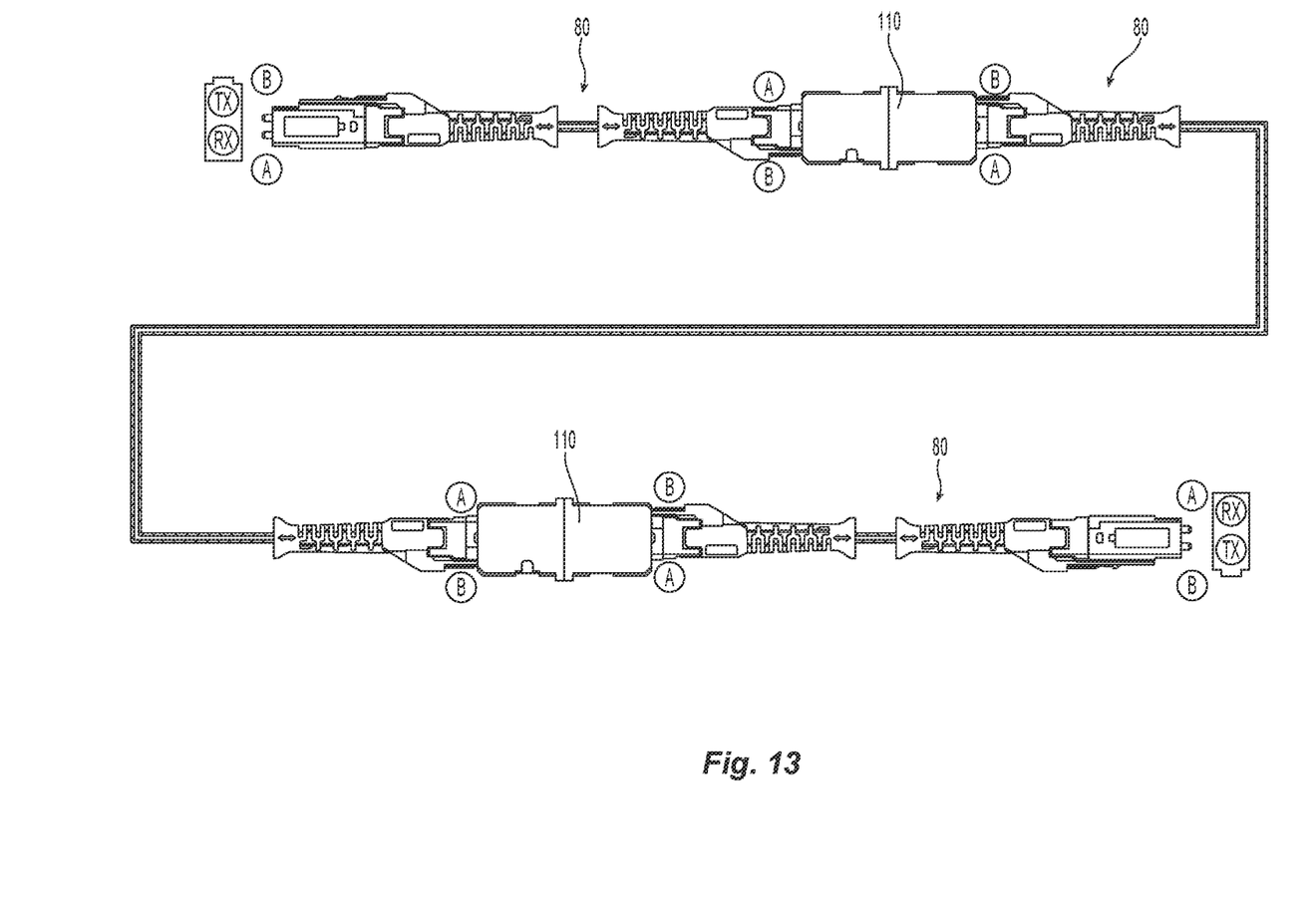
FIG. 13 a side elevation view of three identical "A-to-B" patch cords and two opposed key adapter used to connect two transceivers.

FIG. 13 illustrates that the optical patch panel connection of the present invention also works with two patch panels or adapters 110 that are disposed between the identical patch cords 80. Thus, regardless of whether there are an odd number or even number of A-to-B patch cords required, the combination of the A-to-B patch cords 80 and the adapter 110 will provide the correct connection, and the user does not have to track the optical connection polarity at each junction between two transceivers.

Figure 14:
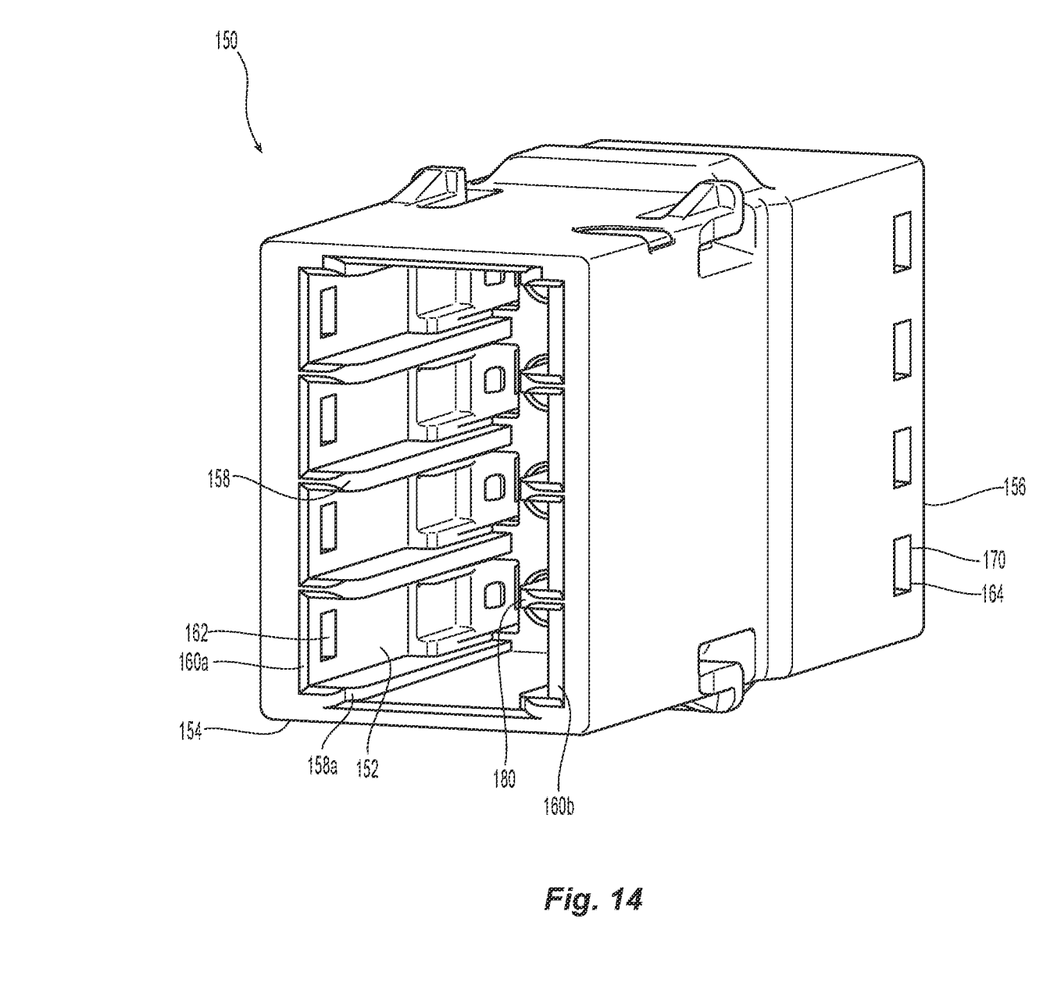
FIG. 14 is a perspective view of another embodiment of an adapter that can be used with the present invention.

FIG. 14 illustrates that there may be an adapter that receives more than one multifiber connector. Adapter 150 is able to receive four multifiber connectors on each side. Since each area that receives a multifiber connector is the same, only one will be discussed here. The adapter 150 has an opening 152 extending between a first side 154 and a second side 156 to receive one of the first and the second multi-fiber connectors 20. The opening 152 is bounded by four pairs of long sided walls 158a,158b and four pair of short sided walls 160a,160b. Three of the walls (wall 158b, for example) in the adapter 150 are shown as discontinuous or only partially extending between the space for two multi-fiber connectors, but they may be fully extending between two such connectors inserted into the adapter 150. Thus, the adapter 150 can receive multi-fiber connectors from four A-to-B patch cords on the first side 154 of the opening 152, and four similar multifiber connectors from another set of A-to-B patch cords on the second side 156. The opening 152 extends between the first and second sides 154,156. The adapter 150 has a first keyway 162 at the first side 154 and a second keyway 164 at the second side 156. The keyways 162,164 in this adapter include an opening 170 in one of the short sided walls 160a,160b. The keyways 162,164 being on opposite short sided walls 160a,160b and across the opening 152 from each other, but both are in communication with the opening 152. The adapter 110 may also have other support structures 180 that support and assist in mating the duplex MDC connector 20 from each side.

There is also an optical patch panel connection to connect two transceivers to one another that consists of a plurality of A-to-B patch cords, each of the A-to-B patch cords being identical and consisting of a first multi-fiber connector having a connector key and a second multi-fiber connector having a connector key oriented at a different location on the second multi-fiber connector than the connector key of the first multi-fiber connector, the first and the second multi-fiber connectors being connected together by optical fibers; and a plurality of adapters, each of the plurality of adapters being identical and having an opening extending between a first side and a second side, the opening to receive the first multi-fiber connector from a first of the plurality of A-to-B patch cords on the first side and to receive the second multi-fiber optic connector from a second of the plurality of A-to-B patch cords on the second side, the opening bound by a pair of long sided walls and a pair of short sided walls of a main body of the adapter and extending between the first and second sides, the adapter including a first keyway on the first side to receive the connector key from the first fiber optic connector from the first of the plurality of A-to-B patch cords and a second keyway on the second side to receive the connector key from the second of the plurality of A-to-B patch cords, the first and second keyways being on opposite sides of the opening.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An optical patch panel connection comprising:
   a first multi-fiber connector having a first multifiber ferrule, the first multi-fiber connector including a connector key on a first short side thereof and a second multi-fiber connector having a second multifiber ferrule, the second multi-fiber connector including a connector key on a second short side thereof, the first and the second multi-fiber connectors being connected together by optical fibers terminated in the respective first and second multifiber ferrules to form a first A-to-B patch cord; and
   at least one adapter having an opening extending between a first side and a second side to receive one of the first and the second multi-fiber connectors, the opening bound by a pair of long sided walls and a pair of short sided walls and extending between the first and second sides, the pair of long sided walls being longer than the pair of short sided walls when viewed directly in front of the opening on each of the first side and the second side of the at least one adapter such that the height of the at least one adapter is more than a width thereof, the adapter including a first keyway at the first side and a second keyway at the second side and the first keyway on an opposite side of the opening from the second keyway, the first and the second keyways being in communication with the opening,
   wherein the first A-to-B patch cord is connected to the adapter on the first side with the connector key of the first or the second multi-fiber connector mated to the first keyway and to a second A-to-B patch cord identical to the first A-to-B patch cord, the second A-to-B patch cord having a third multi-fiber connector and a fourth multi-fiber connector connected together in a configuration identical to the first multi-fiber connector and the second multi-fiber connector, the third multi-fiber connector having a third multifiber ferrule, the third multi-fiber connector including a connector key on a third short side and the fourth multi-fiber connector also having a fourth multifiber ferrule, the fourth multi-fiber connector including a connector key on a fourth short side thereof, the third short side being opposite the fourth short side,
   wherein the second A-to-B patch cord is connected to the at least one adapter on the second side with the connector key of the third or the fourth multi-fiber connector mated to the second keyway, and
   wherein the first side of the at least one adapter has a keyway opening on only one of the short sides of the at least one adapter to secure the first multi-fiber connector or the second multi-fiber connector to the first side of the at least one adapter, and wherein the second side of the at least one adapter also has a keyway opening on only one of the short sides that is diagonally opposite the short side on the first side having the keyway opening to secure the third multi-fiber connector or the fourth multi-fiber connector to the second side of the at least one adapter.

2. The optical patch panel connection according to claim 1, wherein each of the multi-fiber connectors supports at least three optical fibers.

3. The optical patch panel connection according to claim 1, wherein the first keyway at the first side is on one of the pair of short sides and the second keyway at the second side is on another of the pair of short sides.

4. The optical patch panel connection according to claim 1, wherein the optical patch panel connection has a plurality of adapters that are identical to the at least one adapter and a plurality of A-to-B patch cords that are identical to the first A-to-B patch cord.

5. The optical patch panel connection according to claim 1, wherein at least one of the A-to-B patch cords is connected to a transceiver.

6. An optical patch panel connection comprising:
   a first multi-fiber connector having a first multifiber ferrule, the first multi-fiber connector including a connector key and a second multi-fiber connector having a second multifiber ferrule, the second multi-fiber connector including a connector key opposite to the connector key of the first multi-fiber connector, the first and the second multi-fiber connectors being connected together by optical fibers terminated in the respective first and second multifiber ferrules to form a first A-to-B patch cord; and
   at least one adapter attachable to an optical patch panel, the at least one adapter having an opening extending between a first side and a second side to receive one of the multi-fiber connectors, the opening bound by a pair of long sided walls and a pair of short sided walls and extending between the first and second sides, the pair of long sided walls being longer than the pair of short sided walls when viewed directly in front of the opening on each of the first side and the second side of the at least one adapter such that the height of the at least one adapter is more than a width thereof, the adapter including a first keyway on the first side and a second keyway on the second side, the first and the second keyways being in communication with the opening and each having a single keyway opening on the first side and a single keyway opening on the second side on one of the pair of short sided walls, the single keyway opening on the first side being located diagonally opposite the single keyway opening on the second side, wherein the first A-to-B patch cord is connected to the adapter on the first side with the connector key of the first or the second multi-fiber connector mated to the first keyway and to a second A-to-B patch cord identical to the first A-to-B patch cord, the second A-to-B patch cord connected to the adapter on the second side with a connector key of a corresponding multi-fiber connector mated to the second keyway.

7. The optical patch panel connection according to claim 6, wherein the each of the multi-fiber connectors supports at least three optical fibers.

8. The optical patch panel connection according to claim 6, wherein the first keyway at the first side is one of the pair of short sides and the second keyway at the second side is on another of the pair of short sides.

9. The optical patch panel connection according to claim 6, wherein the optical patch panel connection has a plurality of adapters that are identical to the at least one adapter and a plurality of A-to-B patch cords that are identical to the first A-to-B patch cord.

10. The optical patch panel connection according to claim 6, wherein at least one of the A-to-B patch cords is connected to a transceiver.

11. The optical patch panel connection according to claim 6, wherein the adapter has a plurality of openings.

12. The optical patch panel connection according to claim 6, wherein the first and second keyways are on opposite sides of the opening.

13. An optical patch panel connection to connect two transceivers to one another comprising:
a plurality of A-to-B patch cords, each of the plurality of A-to-B patch cords being identical and consisting of a first multi-fiber connector having a first multifiber ferrule, the first multi-fiber connector including a connector key and a second multi-fiber connector having a second multifiber ferrule, the second multi-fiber connector including a connector key in a flipped orientation relative to the connector key of the first multi-fiber connector, the first and the second multi-fiber connectors being connected together by optical fibers terminated in the respective first and second multifiber ferrules; and
a plurality of adapters, each of the plurality of adapters being identical and having an opening extending between a first side and a second side, the opening bound by a pair of long sided walls and a pair of short sided walls and extending between the first and second sides, the pair of long sided walls being longer than the pair of short sided walls when viewed directly in front of the opening on each of the first side and the second side of the at least one adapter such that the height of the at least one adapter is more than a width thereof to receive the first multi-fiber connector from a first of the plurality of A-to-B patch cords on the first side engaging a first keyway opening on the first side and to receive the first multi-fiber connector from a second of the plurality of A-to-B patch cords on the second side engaging a second single keyway opening on the second side, the adapter including a first keyway having the first keyway opening on the first side to receive the connector key from the first multi-fiber connector from the first of the plurality of A-to-B patch cords and a second keyway having the second keyway opening on the second side to receive a connector key from the second multi-fiber connector from the second of the plurality of A-to-B patch cords, the first and second keyways being on opposite sides of the opening, wherein the first keyway opening and the second keyway opening are located on opposing sides on the first side and the second side, respectively.

14. The optical patch panel connection according to claim 13, wherein the opening is bound by a pair of long sided walls and a pair of short sided walls of a main body of the adapter and extending between the first and second sides.

15. The optical patch panel connection according to claim 14, wherein the first keyway on the first side is on one of the pair of the short sided walls and the second keyway on the second side is on the other one of the pair of the short sided walls.

16. The optical patch panel connection according to claim 13, wherein the first multi- fiber connector and the second multi-fiber connector are each a duplex connector.

17. The optical patch panel connection according to claim 13, wherein the first multi-fiber connector and the second multi-fiber connector each support at least three optical fibers.

* * * * *